(12) United States Patent
Drennen, III (10) Patent No.: US 8,340,218 B2
(45) Date of Patent: Dec. 25, 2012

(54) INTEGRATED MICRO-SAMPLING WIRELESS RECEIVER

(75) Inventor: William J. Drennen, III, Elverson, PA (US)

(73) Assignee: TruePosition, Inc., Berwyn, PA (US)

( * ) Notice: Subject to any disclaimer, the term of this patent is extended or adjusted under 35 U.S.C. 154(b) by 995 days.

(21) Appl. No.: 12/345,870

(22) Filed: Dec. 30, 2008

(65) Prior Publication Data

US 2010/0166112 A1 Jul. 1, 2010

(51) Int. Cl.
*H03K 9/00* (2006.01)
*H04L 27/06* (2006.01)

(52) U.S. Cl. ........................................ 375/316; 375/340

(58) Field of Classification Search ................. 375/260, 375/316, 340, 355; 455/1
See application file for complete search history.

(56) References Cited

U.S. PATENT DOCUMENTS

| | | | |
|---|---|---|---|
| 6,580,944 B1 * | 6/2003 | Katz et al. ..................... | 600/513 |
| 2004/0213351 A1 * | 10/2004 | Shattil .......................... | 375/260 |
| 2005/0215193 A1 * | 9/2005 | Kummetz ...................... | 455/1 |
| 2007/0086544 A1 * | 4/2007 | Fudge et al. .................. | 375/316 |
| 2008/0031388 A1 * | 2/2008 | Rabbath et al. ............... | 375/346 |

OTHER PUBLICATIONS

PCT Notification of Transmittal of the International Search Report and the Written Opinion of the International Searching Authority mailed Feb. 26, 2010, issued in corresponding International Application No. PCT/US2009/067768.
U.S. Appl. No. 11/948,244, "Automated Configuration of a Wireless Location System," filed Nov. 30, 2007, 31 pages.
U.S. Appl. No. 12/268,989, "Femto-cell Location by Direct Methods," filed Nov. 11, 2008, 41 pages.

* cited by examiner

*Primary Examiner* — David C. Payne
*Assistant Examiner* — Wednel Cadeau
(74) *Attorney, Agent, or Firm* — Woodcock Washburn LLP (57) ABSTRACT

Disclosed are methods and systems for filtering an intermediate frequency (IF) band when digitizing a radio frequency (RF) signal using a higher Nyquist zone several times above the sampling rate. Undersampling may be employed along with an undersampled Nyquist filtering technique to implement an integrated receiver for base station applications such as wireless base station beacon monitoring. Such a receiver may be integrated into a smaller package and consume less power at a reduced cost. In one embodiment, the receiver may operate at a high RF sampled frequency that is microsampled in the $10^{th}$ Nyquist zone at less than 20% undersampling. In another embodiment, the receiver may operate in the $5^{th}$ Nyquist zone at ½ the sampling rate with 40% undersampling. In various embodiments, sampling and processing functions may be implemented using software on a computer or other embedded computing device.

14 Claims, 12 Drawing Sheets

INTEGRATED MICRO-SAMPLING WIRELESS RECEIVER

TECHNICAL FIELD

The subject matter described herein relates generally to methods and systems for software defined radio (SDR) receivers with wide receiver bandwidths. More particularly, but not exclusively, the subject matter described herein relates to the use of a sampling technique with sample rates below the Nyquist limit to lower the cost, complexity, power consumption, and size of SDR receivers.

BACKGROUND

When sampling a waveform, in order to fully recover the original waveform it is necessary to use a sampling rate at least two times the highest waveform frequency. The Nyquist frequency, also called the Nyquist limit, is the highest frequency that can be coded at a given sampling rate in order to be able to fully reconstruct the original signal.

Software defined radios that use broadband digital receivers typically utilize high dynamic range, high speed analog-to-digital converters (ADCs) at the end of the analog receiver chain to digitize the received signal. ADCs are typically hardware devices and once implemented in the SDR, the ADC's capabilities are fixed.

The dynamic range (DR) of a radio receiver is essentially the range of signal levels over which the receiver can operate. The low end of the range is governed by the receiver's sensitivity while at the high end the receiver's sensitivity is governed by the receiver's overload or strong signal handling performance. Network-based wireless location systems must receive both strong locally generated radio signals and weaker signals generated in neighboring or geographically proximate cells to produce a Time-difference-of-arrival (TDOA) or TDOA/Angle of Arrival (AoA). Therefore, high DR radio receivers are high desirable in such systems. Furthermore, the need to deploy a plurality of geographically distributed receivers throughout the wireless network coverage area necessitates that the radio receivers be as inexpensive and robust as possible.

Increasingly, both uplink and downlink signals are used by the Uplink Time Difference of Arrival (U-TDOA) Wireless Location System (WLS) to locate mobile stations, base stations, and repeaters as disclosed in commonly assigned patent application Ser. No. 11/948,244 "Automated Configuration of a Wireless Location System" and Ser. No. 12/268,989 "Femto-cell Location by Direct Methods."

High dynamic range receivers should have good performance at both ends of the receiver's dynamic range in order to detect both very low power levels and much higher power level signals. At the low end of the range, the receiver should have very high sensitivity by having a low noise figure so that the receiver can separate the signal from the noise. At the high end of the range the receiver should be sufficiently linear to receive higher level signals without distortion. Both of these performance goals may be limited by the bandwidth of the receiver. Therefore, the design of a high DR receiver that at the same time can operate over a broad bandwidth is a challenging task.

One such challenge is the near-far problem. The near-far (or hearability) problem may be defined as the problem of detecting and receiving a weaker signal in the presence of stronger signals. The near-far problem is a classic co-channel interference (also called cross-talk) problem typically arising in cellular frequency reuse networks. The near-far problem arises from the fact that radio signals from transmitters closer to the receiver of interest are received with smaller radio path-loss attenuation than with signals from transmitters located further away. Therefore, the strong signal from the nearby transmitter may mask the weak signal from the more distant transmitter. In Time Division Multiple Access (TDMA)/Frequency Division Multiple Access (FDMA) systems, channelization and frequency reuse patterns are used to limit the effect of the co-channel interference issue. In wideband (1.25 MHz and 5 MHz) direct sequence Code Division Multiple Access (CDMA) based wireless communications systems (IS-95, IS-2000, UMTS) the near-far effect, combined with imperfect orthogonality between codes, leads to substantial interference even with fast radio power control since multiple mobile devices may use the same channel. Since a network-based wireless location must be able to detect and in some cases demodulate signals arising from the local cell, neighboring cells and geographically proximate cells, the location system receivers must maintain a very stringent constraint on the dynamic linearity of the gain stage. Otherwise, harmonics or other spurious responses of the strong signal that are captured in the wrong frequency bin could easily hide the weaker signal-of-interest.

The sensitivity of the low noise performance of the receiver is affected by bandwidth (BW) as broadband components are typically higher in losses and the noise figure of Low Noise Amplifiers (LNAs) generally increases with increasing bandwidth. The linearity of the receiver is affected by increasing bandwidth in two ways. First, increasing instantaneous RF bandwidth allows more in-band signals that may create non-linear products either by intermediation or by simple saturation due to their own power levels. Second, higher intermediate frequency (IF) bandwidths are more difficult to adequately filter before digitizing in the ADC. To maintain the dynamic range of the analog portion of the radio, the IF signal's images in adjacent Nyquist zones must be filtered before sampling in the ADC. The filter must reject adjacent images to at least the same level as the required dynamic range. As bandwidth increases, the required fractional bandwidth of the filter also increases making the filter more difficult to implement. The loss of the filter also increases and starts to affect dynamic range as well. For very high DR receivers, filter loss can be the limiting factor as the bandwidth is increased. This is especially true where Surface Acoustic Wave (SAW) filter technology is used to achieve very high dynamic range. SAW filter components also have very low insertion loss at high intermediate frequencies. Increasing the sampling rate may increase the width of the Nyquist zones and ease the rejection requirement of the IF filter because adjacent images are now farther away.

It would be advantageous if the above problems of designing a high DR receiver that at the same time can operate over a broad bandwidth can be addressed with a sampling technique to lower the cost, complexity, power consumption, and size of SDR receivers.

SUMMARY

The following summary provides an overview of various aspects of exemplary embodiments of the present disclosure. This summary is not intended to provide an exhaustive description of all of the important aspects of the disclosed subject matter, or to define the scope of the disclosure. Rather, this summary is intended to serve as an introduction to the following description of illustrative embodiments.

As discussed above, increasing the sampling rate will increase the width of the Nyquist zones and ease the rejection requirement of the IF filter because adjacent images are now farther away. A more effective method is disclosed herein by microsampling wherein the sampled IF itself is pushed up into the upper range of the ADC device using a higher Nyquist zone several times above the sampling rate. As the IF filter loss is reduced, the analog dynamic range may be preserved while the digital dynamic range may become easier to implement.

Network WLS's, either overlaid or integrated into the base station, require the application of high dynamic range digital receivers in which the signal chain can be simplified such that high integration is possible while maintaining full bandwidth coverage and high dynamic range. A high level of integration may be achieved through extreme undersampling wherein very low loss SAW filter technology can be exploited, thus further reducing the complexity of the signal chain.

Extreme undersampling may be employed along with an undersampled Nyquist filtering technique to enable an integrated down link beacon receiver for base station applications such as wireless base station beacon monitoring. In one embodiment, such a receiver may operate in at a high RF sampled frequency that is microsampled in the $10^{th}$ Nyquist zone at less than 20% undersampling. In another embodiment, the receiver may operate in the $5^{th}$ Nyquist zone at ½ the sampling rate with 40% undersampling.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

DETAILED DESCRIPTION OF ILLUSTRATIVE EMBODIMENTS

Certain specific details are set forth in the following description and figures to provide a thorough understanding of various embodiments of the invention. Certain well-known details often associated with signal processing, computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

In a network-based wireless location system (WLS) using time-difference-of-arrival (TDOA), angle-of-arrival (AoA), a TDOA/AoA hybrid, or as part of a TDOA/Global Navigation Satellite System (GNSS) solution for mobile station positioning, high dynamic range (DR) receivers are desirable for signal detection and measurement. The quality of the geographically distributed receivers in a WLS may directly impact the location accuracy as the accuracy of network-based systems is based on the number of cooperating receivers to overcome geometric-dilution-of-precision (GDOP) inherent in such location systems. The higher the dynamic range, the more uplink signals or downlink signals transmitted over the greatest geographic range of coverage can be detected, thereby increasing the average number of cooperating receivers.

Figure 1:
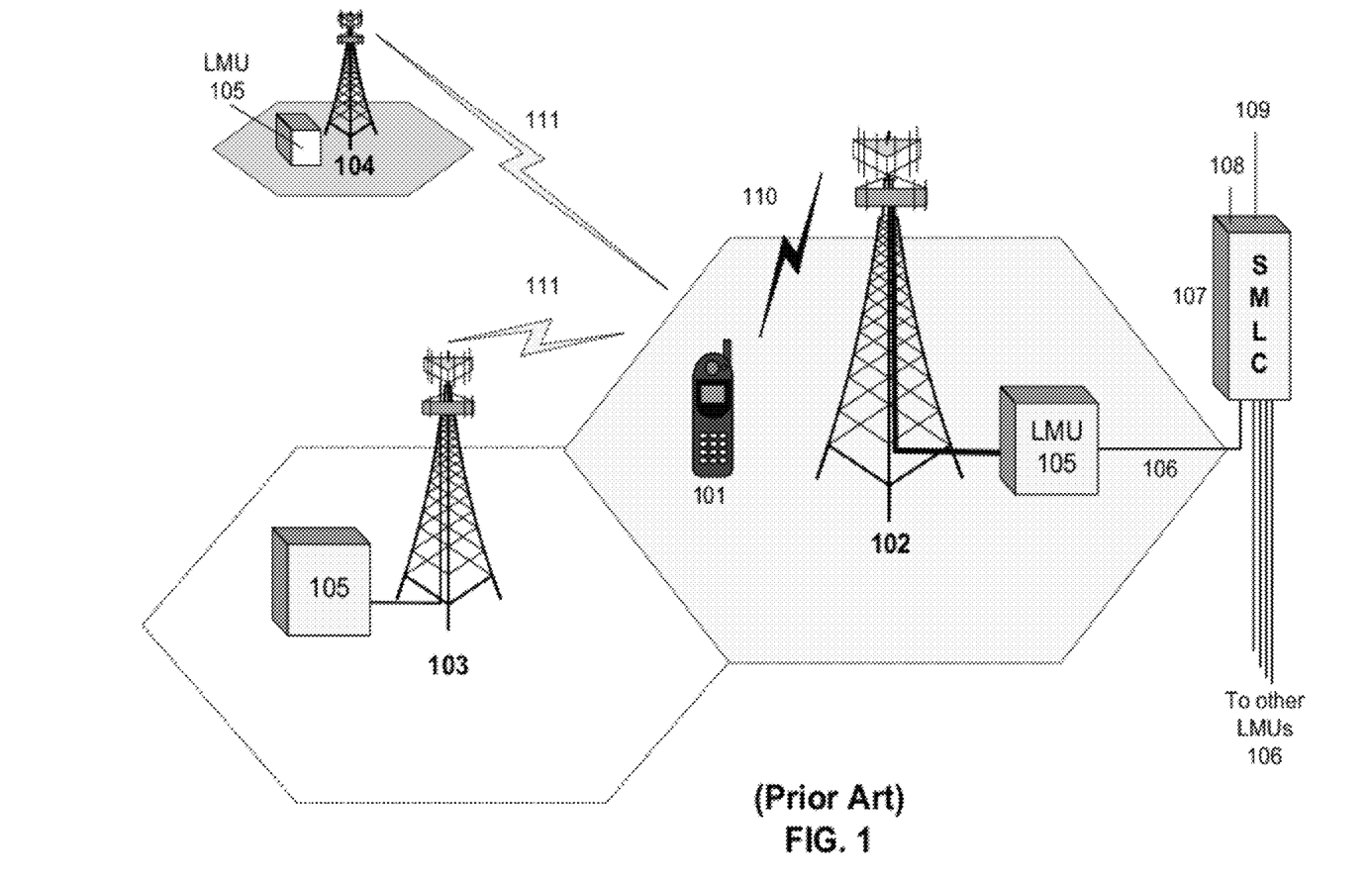
FIG. 1 depicts a network-based wireless location system.

FIG. 1 is a graphical depiction of an exemplary network-based wireless location system. As shown in the figure, multi-mode mobile device 101 is in communication with a serving cell 102 via a radio link 110. Mobile uplink transmissions 110 111 are detectable by at least three neighboring and proximate LMUs 105 and thus can be used to develop a Time-Difference-of-Arrival (TDOA) location estimate, a Angle-of-Arrival (AoA) location estimate, a hybrid TDOA/AoA location estimate, or contribute to a hybrid TDOA/GPS location calculation. As shown, the LMUs 105 are co-located with base stations 102 103 104.

The SMLC 107 may coordinate the LMU tasking via the SMLC-to-LMU packet data links 106. The SMLC 107 also receives the LMU timing data, other collateral information such as GPS pseudoranges, mobile collected Cell-ID, and timing or power measurements if available. The SMLC 107 also produces the final location estimate. The SMLC 107 may either push an autonomous location (produced in response to a pre-set trigger) to a Wireless Communications Network node (such as the MPC or GMLC, not shown) or respond to a prior Location Request from an external location services node (not shown). The SMLC 107 may maintain multiple digital packet communications links 108 109 with served Wireless Communications Network(s) or external location services node(s).

Figure 2A:
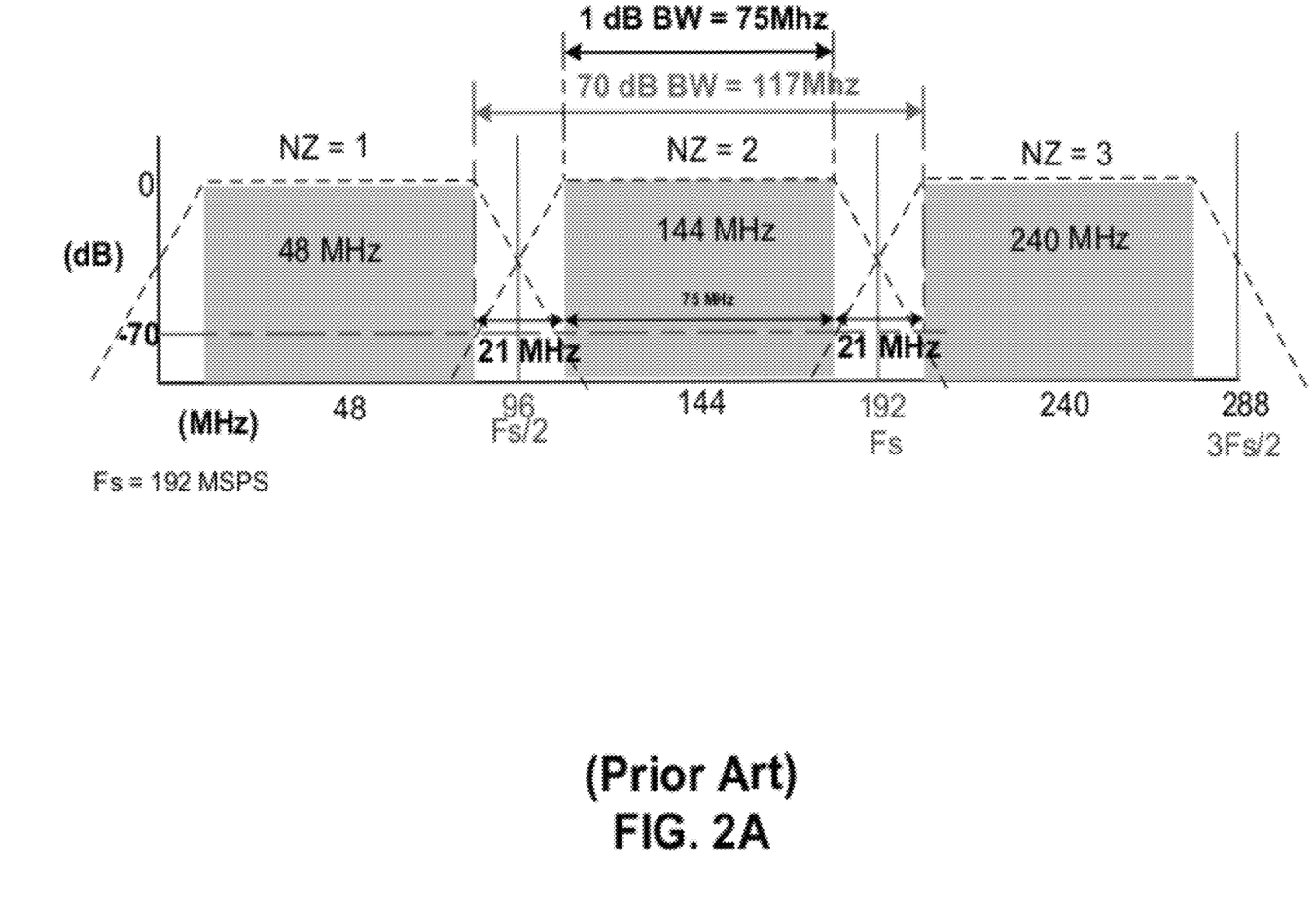
FIG. 2a shows an example of Nyquist sampling in the intermediate frequency range of a multi-stage radio receiver.

Broadband digital receivers utilize high dynamic range and high speed analog-to-digital converters (ADCs) at the end of the analog receiver chain to digitize the received signal. The way in which the broadband digital receiver's ADCs are implemented in the frequency sampling plan establishes the band architecture of the digital receiver. FIG. 2*a* illustrates an exemplary broadband frequency sampling plan. Referring to the figure, the sampling spectrum is divided into Nyquist zones which are defined by the sampling rate (Fs). The width of each Nyquist zone is Fs/2 which also defines the Nyquist boundaries. From sampling theory, alias images exist in every Nyquist zone for any signal in the sampling spectrum. Therefore, anti-alias filtering must be deployed to preserve the dynamic range of the analog to digital converter. The anti-alias filtering should provide as much image rejection as required by the specified dynamic range. The bandwidth of the sampled signal is limited by the filtering that can be realized within the width of the Nyquist zone. FIG. 2*a* shows the required filter rejection for the illustrated sampling plan centered at 144 MHz in the second Nyquist zone using a sampling frequency of 192 MHz. The goal of the illustrated design goal is to achieve 75 MHz of signal bandwidth with 70 dB of dynamic range. In one embodiment this goal can be achieved by using a sampling rate as high as possible in a 12 bit ADC device that can maintain the ADC's performance.

The example shown in FIG. 2*a* illustrates the filtering challenge encountered in broadband designs. In the example, which illustrates a traditional approach, the design objective is to exploit the high speed capability of ADCs by pushing the sampling rate (Fs) in order to maximize bandwidth and dynamic range. At higher sampling rates, the Nyquist zone (½ Fs) bandwidth increases, thus allowing for more usable bandwidth. To preserve the dynamic range of the ADC, up to 70 or 80 dB of filter rejection is sometimes required. These filtering requirements are usually met by employing multiple filter stages and high loss IF SAW filter devices. The use of multiple filter stages and the high loss SAW devices greatly complicates the receiver chain because the loss must be compensated through the use of additional amplifier stages. The loss of the IF SAW devices is a direct consequence of the fractional bandwidth and the fact that as bandwidth requirements increase, the compensation for the extra loss also increases. In addition, SAW filters typically have very poor voltage standing wave ratio (VSWR) and must be passively matched with resistive pads, thus further increasing loss. The resulting receiver chain must employ several amplifier and attenuator stages.

Figure 3:
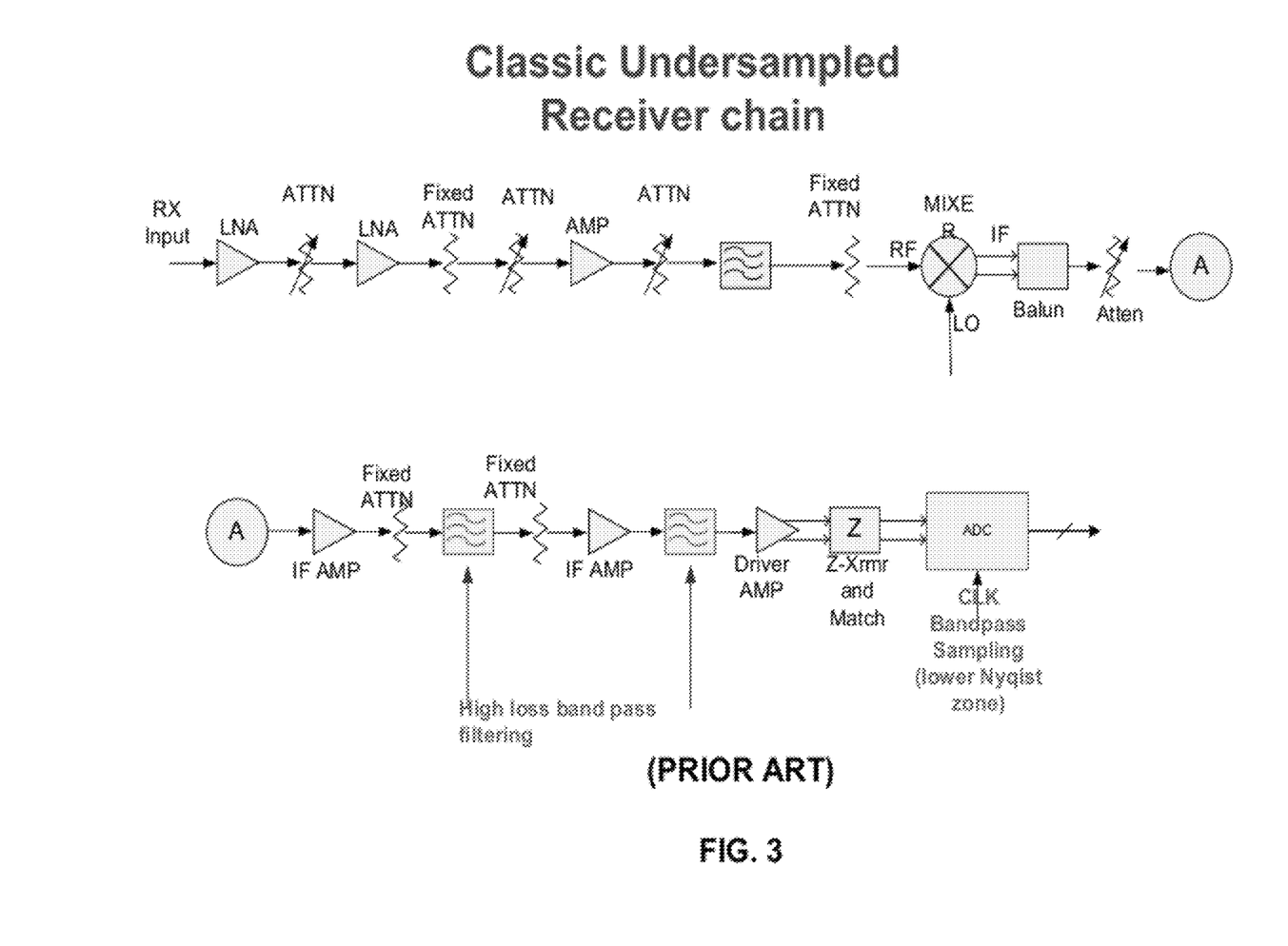
FIG. 3 schematically depicts the stages and construction of a classic under-sampling multi-stage radio receiver.

FIG. 3 illustrates a typical block diagram of such a receiver chain used to implement a receiver for the sampling plan depicted in FIG. 2*a*. In this example, the sampling rate is set at the high end of the available range of a typical commercially available high dynamic range ADC in order to maximize bandwidth for a receiver designed to achieve 70 dB of dynamic range. The sampling plan in FIG. 2*a* indicates that in order to achieve such a dynamic range using the second Nyquist zone centered at 144 MHz, the 70 dB to 1 dB filter shape factor is (17/75) 1.56:1. Two stages of filtering are typically required to obtain this performance. IF SAW filters are typically employed for this function. In this case the IF SAW filter may have a very high insertion loss of about 17 dB and an addition loss of about 6 dB may be required because of port matching. The resulting IF chain requires the addition of amplifier stages to adequately compensate for this loss.

Microsampling

In the above example, the sampling plan included undersampling in the $2^{nd}$ Nyquist zone. Undersampling is distinguished from baseband sampling because the ½ sampling rate Fs/2 is lower than the frequencies being sampled. Baseband sampling occurs in the $1^{st}$ Nyquist zone where the Nyquist criteria is met and the sampling rate Fs is greater than 2× the maximum frequency being sampled. In the undersampling case, higher Nyquist zones are used at frequencies higher than Fs/2. As long as the signal bandwidth is less than Fs/2, the Nyquist criteria is still met and band pass filtering may be used to prevent alias image interference. Undersampling applications typically use one of the first two to five Nyquist zones where both Fs and the sampled frequency band are in the optimal performance range of the ADC device.

In various embodiments disclosed herein, higher Nyquist zones may be selected. The term "microsampling" may refer to higher zones where the sampled frequency band is several times higher than Fs/2. By focusing on increasing the sampled frequency band rather than the sample rate, a number of advantages may be realized.

Figure 4:
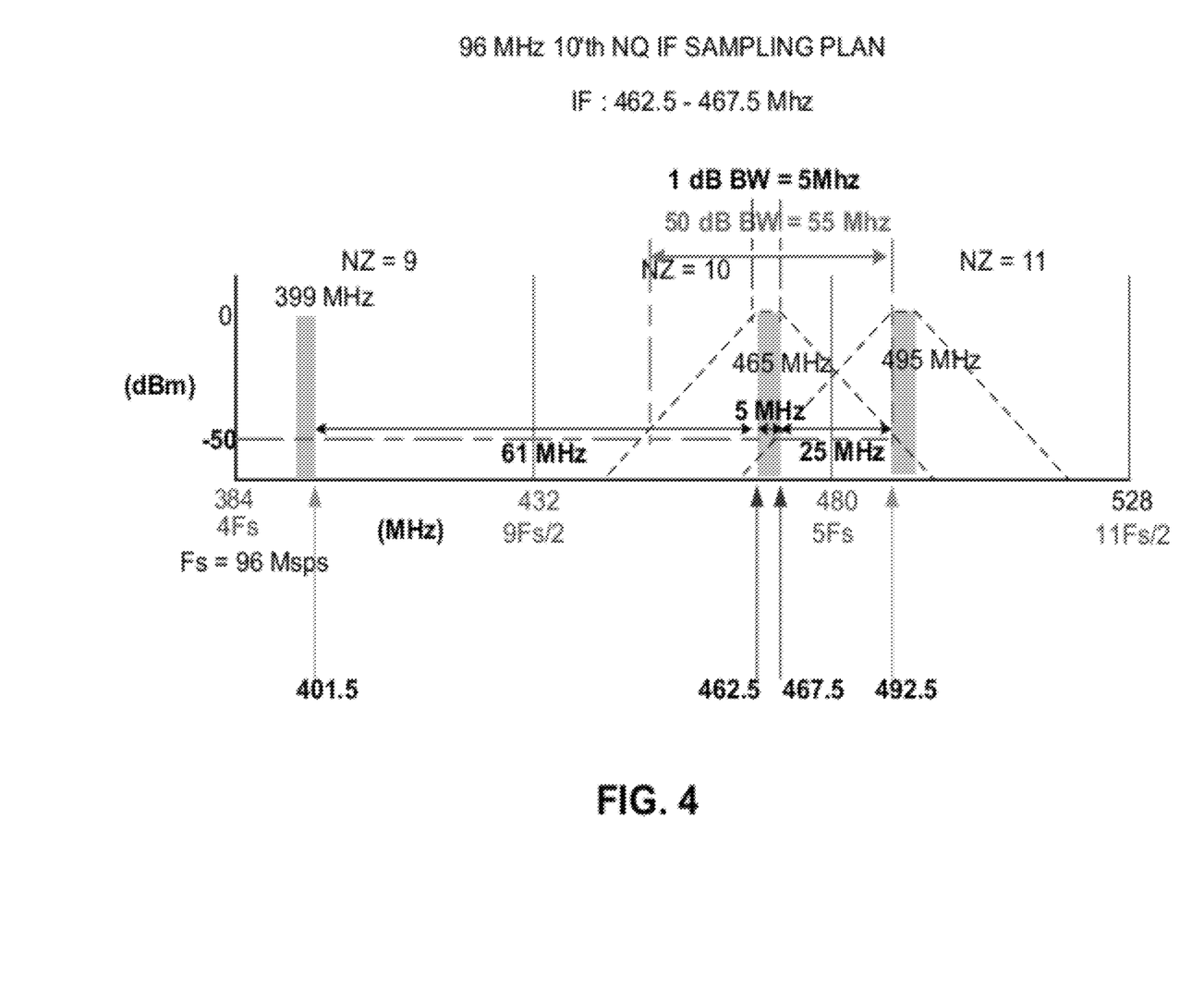
FIG. 4 shows an example of integrated micro-sampling in the intermediate frequency range of a multi-stage radio receiver.

FIG. 4 illustrates an exemplary micro-sampling frequency plan in accordance with the present disclosure. In one illustrative embodiment, the $10^{th}$ Nyquist zone may be chosen at a center frequency of 465 MHz using a sampling rate Fs=96 MHz. High speed ADC devices may operate with this input bandwidth with minimal performance degradation. The frequency band may be selected, as in this example, to match available RF SAW filters in this standard band. The desired shape factor for the SAW filter may be (55/5) 11:1. RF SAW filter technology at this frequency allow may allow for extremely low loss and while being well matched. In one embodiment, the filter in this exemplary application may have a typical loss of only 2 dB and may be sufficiently matched such that no additional resistive pads are needed. Because the filtering can be accomplished with so little impact on the loss and matching of the signal chain, additional amplification normally required to make up for filtering related loss is no longer needed.

Figure 5:
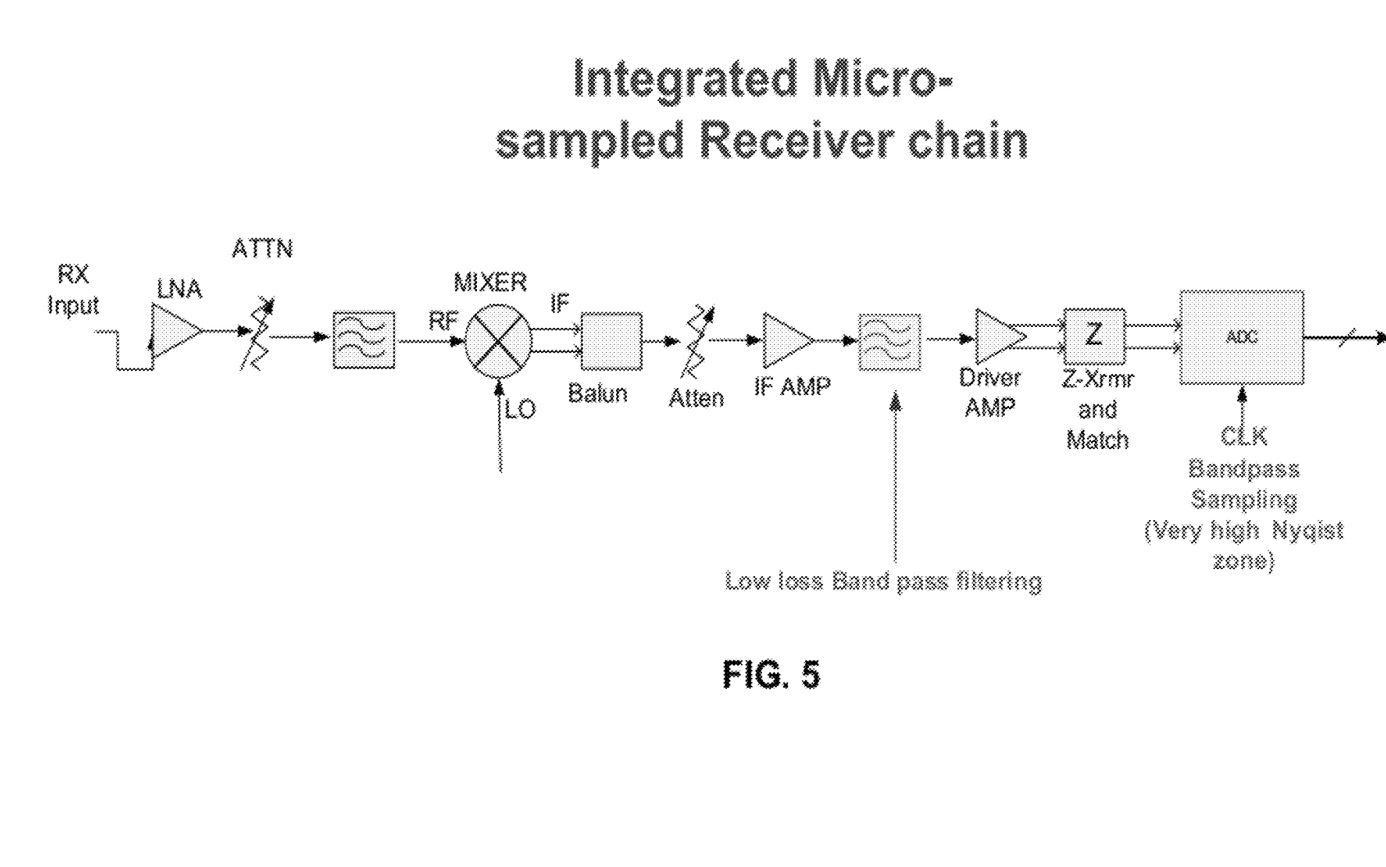
FIG. 5 schematically depicts the stages and construction of an integrated micro-sampling multi-stage radio receiver.

When microsampling is used in conjunction with low loss filtering, the receiver chain can be simplified. To attain this benefit, the frequency band may be chosen such that low loss RF SAW technology allows for the filtering needed to obtain the desired dynamic range. A combination of micro-sampling, appropriate filter planning, and low loss RF SAW filter technology may be used to realize various benefits for an integrated receiver in accordance with the present disclosure. FIG. 5 illustrates an exemplary block diagram of the receiver components that may implement the above design example. Table 1 below provides an example comparison of the microsampled approach with the traditional design approach.

TABLE 1

Receiver Design Comparison

| Design parameter | Traditional | Microsampled |
|---|---|---|
| Fs | 192 MSPS | 96 MSPS |
| Fc | 144 MHz | 465 MHz |

TABLE 1-continued

Receiver Design Comparison

| Design parameter | Traditional | Microsampled |
|---|---|---|
| bandwidth (BW) | 75 MHz | 20/5 MHz |
| DR | 70 dB | 60/75 dB |
| Filtering loss | 32 dB | 1.5 dB |
| Amplifier stages | 5 | 2 |
| Attenuator stages | 9 | 4 |

A feature of the microsampled design approach is a reduction in the number of components. The resulting performance with the reduced number of components may support broadband and high dynamic range design objectives while the receiver may be integrated into a smaller package and consume less power at a reduced cost. Such characteristics may be desirable in applications where high dynamic range can be slightly reduced for the tradeoff of lower cost, power and size.

In an illustrative example of extreme undersampling, an enhanced receiver may be employed along with an undersampled Nyquist filtering technique to implement an integrated down link beacon receiver for base station applications such as wireless base station beacon monitoring. In one embodiment, such a receiver may operate at a high RF sampled frequency that is microsampled in the $10^{th}$ Nyquist zone at less than 20% undersampling. In another embodiment, the receiver may operate in the $5^{th}$ Nyquist zone at ½ the sampling rate at 40% undersampling.

Referring again to FIG. 2a, the figure illustrates an example of a classic undersampling frequency plan. In one exemplary embodiment, the IF sampled frequency band may be centered at 144 MHz in the $2^{nd}$ Nyquist zone using a sampling rate (Fs) of 192 MHz. In this approach, the sampling rate is near the maximum achievable rate of the ADC device without degrading the ADC's performance. The goal of maximizing the sampling rate is to maximize the Nyquist zone bandwidth which in this case is 96 MHz or Fs/2. The design thus allows an entire IF bandwidth of 75 MHz to be sampled as long as the images can be filtered adequately from the adjacent zones as shown in FIG. 2a. The 70 dB reject BW in this case is 117 MHz.

As described above, the traditional approach as illustrated allows for maximizing the bandwidth of a high dynamic range receiver, but places the burden of the receiver's performance on the IF sampling anti-aliasing filter. The filtering necessary to achieve 70 dB rejection typically requires two stages of SAW filtering that may exhibit high loss, poor impedance matching, and may also require additional interstage amplifier stages. The classic approach therefore results in a more complex and expensive design which also requires more board space to implement.

The microsampled approach disclosed herein takes advantage of the properties of band pass filtering together with Nyquist sampling. A filter with the same pass band and reject band performance may be implemented with lower loss and better matching at a higher center frequency. Such characteristics may be further amplified using SAW filter technology which is typically needed for high dynamic range sampling receivers. With a traditional approach, higher Nyquist zones may not be considered because the ADC performance may degrade as the IF sampling frequency is increased. However, with small degradations in ADC performance, using a higher Nyquist zone can greatly reduce the complexity of the receiver.

FIG. 4 illustrates one embodiment of a microsampled IF sampling plan implemented for an exemplary receiver. In an embodiment, in addition to increasing the center frequency of the sampled IF to 465 MHz, the IF bandwidth may also be reduced to 5 Mhz in order to allow for even further simplification. Since the bandwidth is now only 5 MHz, the sampling rate may be reduced to 96 MHz, allowing the Nyquist zone bandwidth to be set at 48 MHz. In this case the filter necessary to filter the reject band may have less than 2 dB of insertion loss while providing sufficient impedance matching. The entire IF receiver chain may be implemented using only a single filter and single amplifier.

In an illustrative embodiment, a Location Measurement Unit (LMU) may employ the above described classic approach for the uplink (UL) receiver and the microsampling approach in the downlink (DL) receiver design. Both receiver designs may be designed for wide RF bandwidth across the wireless spectrum from 700 to 3800 MHz. The UL receiver may be designed for 75 MHz of IF bandwidth, 70 dB of dynamic range and a low noise figure of 4 dB. However, the IF bandwidth presents a difficult IF filtering problem. In order to preserve the dynamic range, the 75 MHz bandwidth should be filtered to provide 70 dB of image rejection in the neighboring Nyquist zones of the ADC.

Figure 2B:
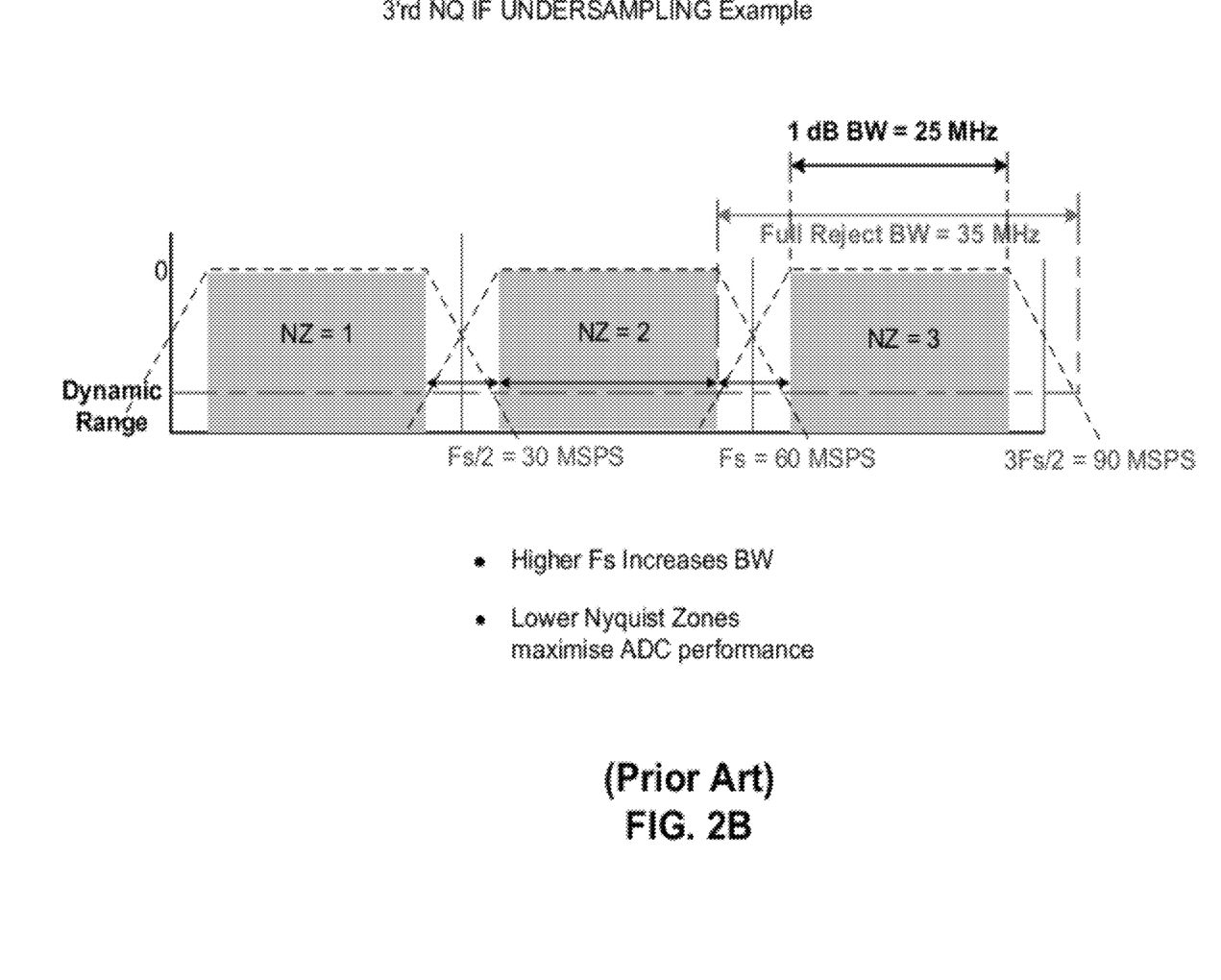
FIG. 2b shows an example of Nyquist sampling in the intermediate frequency range of a multi-stage radio receiver.

When designing the architecture of a digital receiver, a sampling plan may be determined to meet the desired bandwidth and anti-aliasing rejection requirements. In an exemplary sampling plan shown in FIG. 2b, 25 MHz of IF bandwidth is filtered in the $3^{rd}$ Nyquist zone at a sampling rate of Fs=60 MHz. The IF filters used in this design include a high loss first stage SAW filter with 16 dB of insertion loss. SAW filter technology, while offering the desired rejection, also suffers from high loss and poor matching such that the loss must be further compensated by resistive padding at the input and output of the SAW device. Because the desired rejection is needed in such receiver designs, the high IF filtering loss may be tolerated but can degrade the receiver's linearity if not properly compensated with high linearity amplifiers with sufficient gain before and after the high loss filter stage.

Figure 6A:
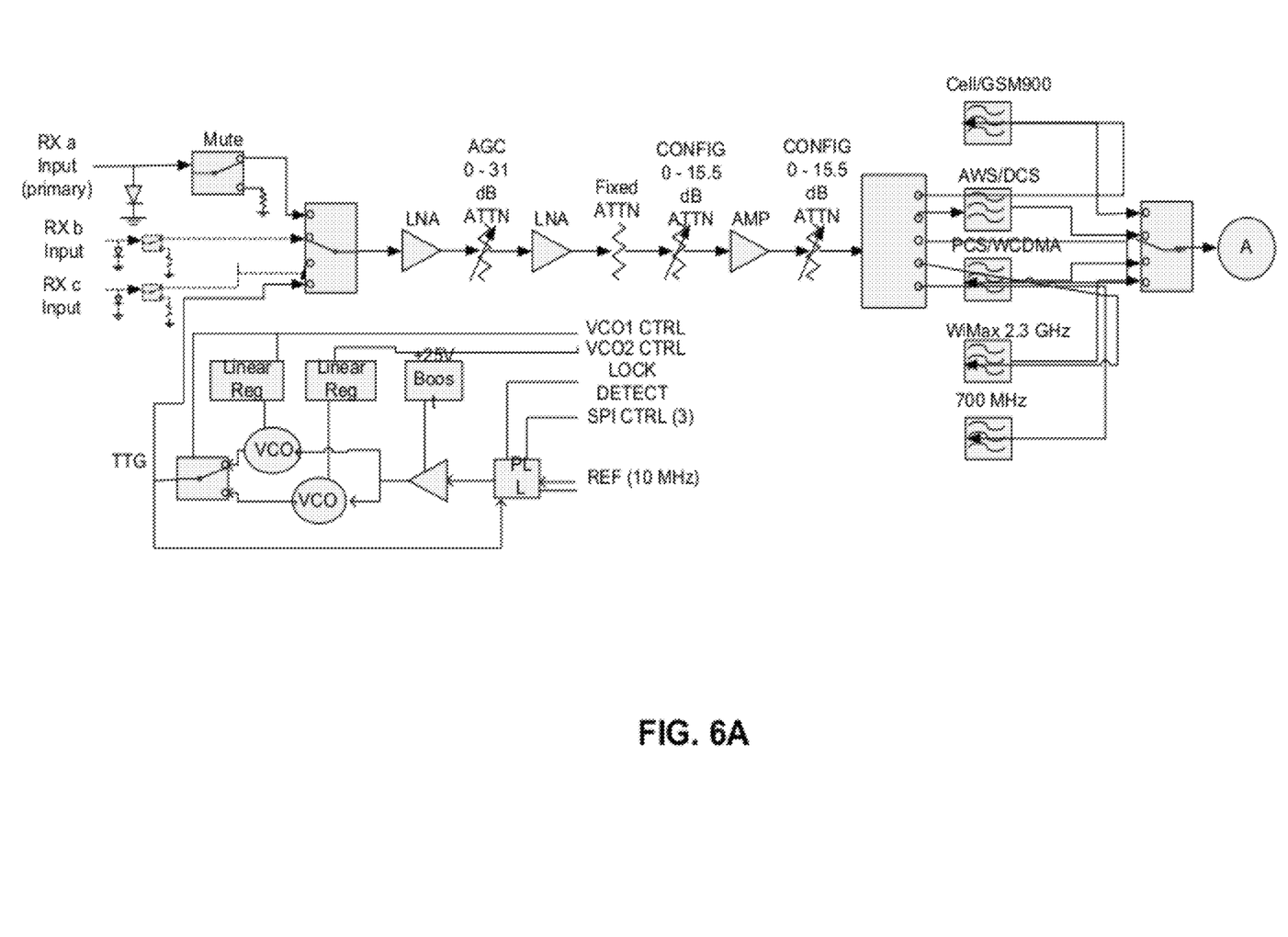
FIGS. 6a and 6b depict a block diagram of the stages and construction of a classic under-sampling multi-stage radio receiver.
Figure 6B:
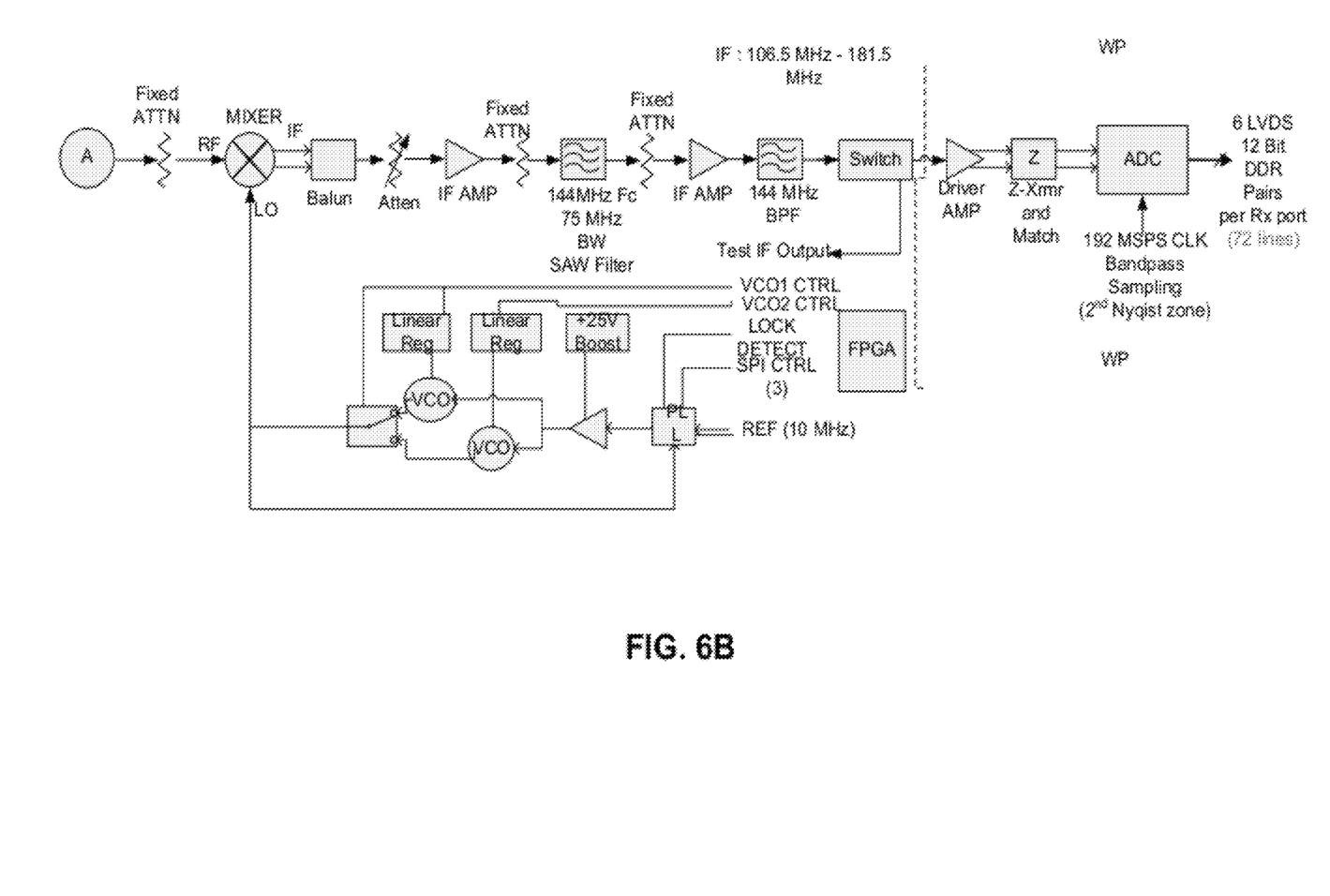

In another example, the above described UL receiver may be designed using the traditional approach to an IF sampling architecture. As shown in FIG. 2a, in order to achieve the 75 MHz bandwidth, the sampling rate may be increased to 192 MHz and the IF centered in the $2^{nd}$ Nyquist zone at 144 MHz. The sampling rate may be increased just enough to allow adequate filtering in the lower Nyquist zones. This approach maximizes the dynamic range of the ADC because the sampling rate (Fs) and IF frequency are kept as low as possible. However, the analog IF section of the receiver must now compensate, thus limiting the dynamic range of the receiver. The IF saw filter loss increases to 23 dB and requires additional resistive pads as well as higher gain linear amplifiers. An illustrative block diagram of the receiver chain is shown in FIGS. 6a and 6b.

The preceding example illustrates that as IF bandwidth is increased, the dynamic range of the receiver may be limited by the required IF filtering when the traditional under sampling plan is applied and the IF frequencies sampled are on the order of the sampling rate Fs. High IF bandwidths and high dynamic range are achievable but the receiver design becomes complex due to burdening by the required high loss IF filtering. As a result, part count, receiver size, cost and power requirements may all be increased while reliability may decrease.

In contrast, in an embodiment the down link receiver may be designed using the microsampling IF plan as exemplified in FIG. 4. In this embodiment the sampling plan may comprise a lower Fs=96 MHz and sample the 5 MHz RF band at 465 MHz in the $10^{th}$ Nyquist zone. Those skilled in the art will readily appreciate that such a sampling plan may provide a number of advantages as compared to other approaches. For example, the RF SAW filter technology need for such a plan may be lower loss while providing a well matched filter for the smaller fractional bandwidth. In this embodiment, the down link beacon receiver that implements such a filter plan may be produced, for example, with a smaller part count, simpler design, lower DC power and lower cost. The 5 MHz bandwidth may be extended to 10 or 15 MHz without much change to the design while providing similar results. The resulting dynamic range may be 60 dB which may be limited by the high IF sampled into the ADC.

Figure 7A:
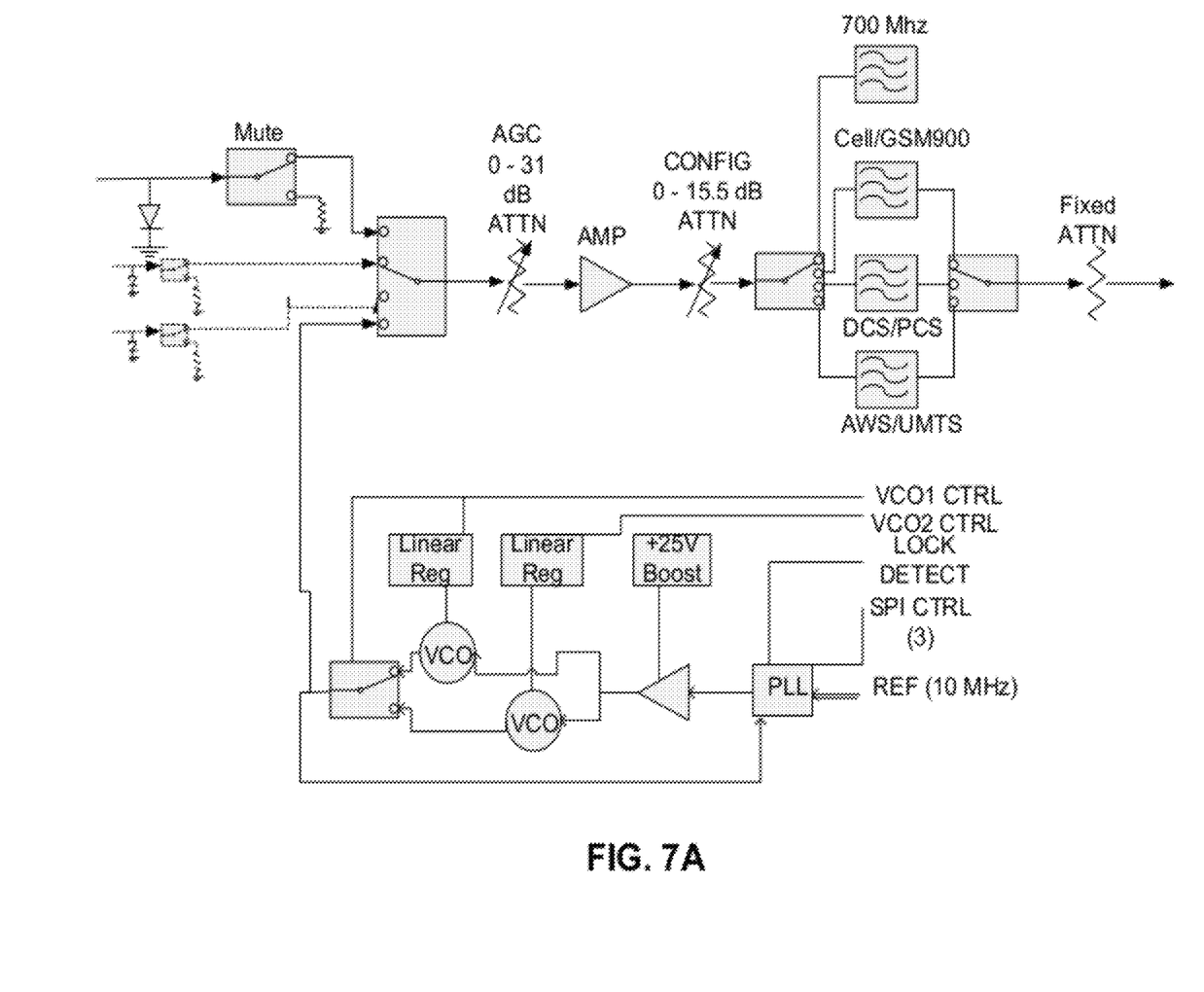
FIG. 7a depicts a block diagram of the receiver chain in an exemplary LMU—Radio Frequency Stage.
Figure 7B:
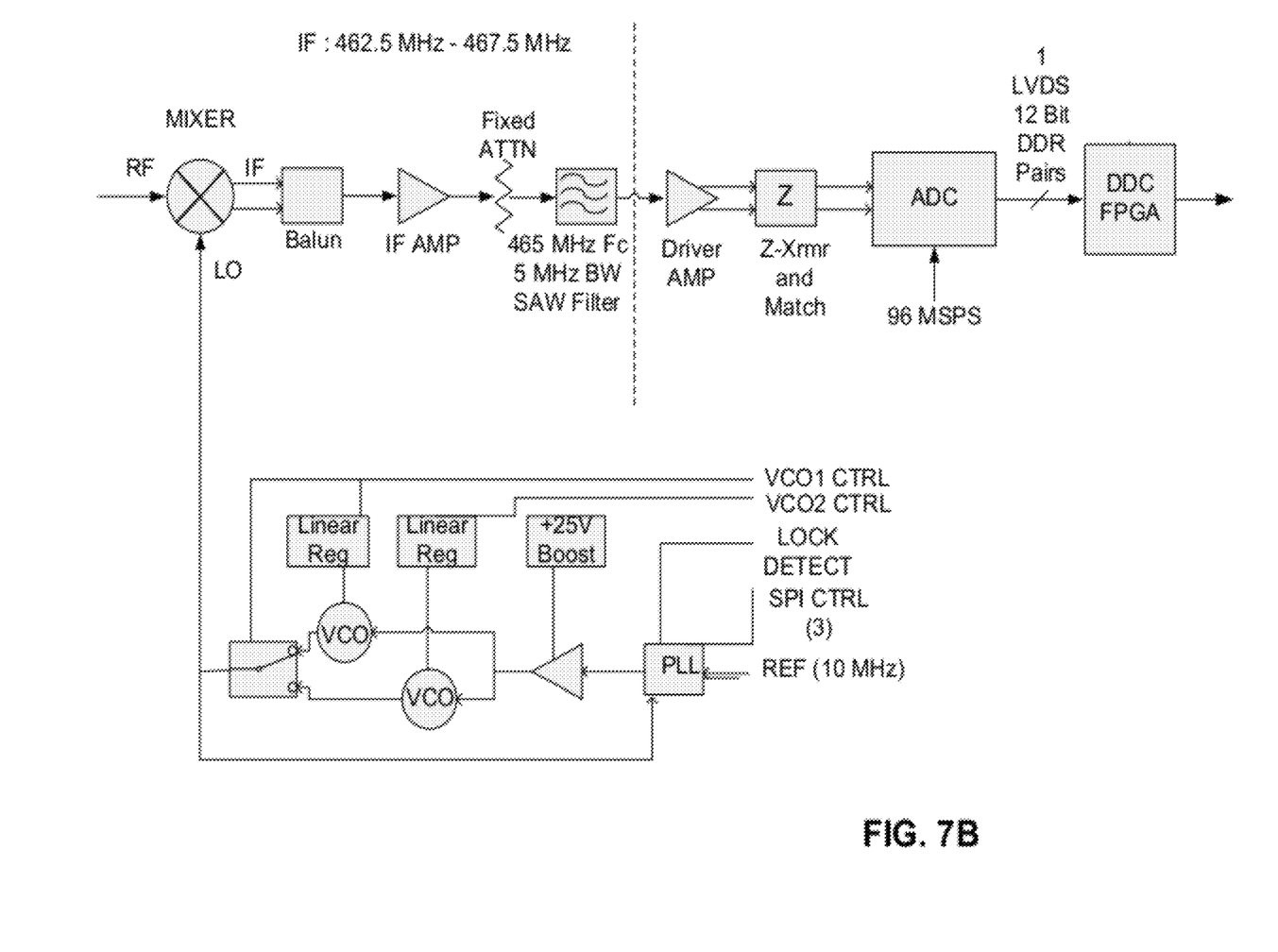
FIG. 7b depicts a block diagram of the receiver chain in an exemplary LMU—Intermediate Frequency and Baseband stages.

The relative simplicity of the DL receiver chain is illustrated in the exemplary block diagram in FIGS. 7a and 7b. The IF filtering may be provided by a single well matched SAW device with only 2 dB of insertion loss. The receiver chain now only needs a single RF and a single IF amplifier stage. Such a design is well suited for integration as a high volume, low cost receiver and for use, for example, in remote LMU modules in distributed base station systems.

In various embodiments, one or more of the functions described above may be implemented in a system where functions that have typically been implemented in hardware (i.e. the ADC) may be implemented using software on a computer or other embedded computing device. While some signal processing tasks may be implemented in software, the rapidly evolving capabilities of digital electronics and processors in particular are making practical many RF receiver tasks that were once only theoretically possible. For example, digital receivers typically utilize high dynamic range, high speed ADCs at the end of the analog receiver chain to digitize the received signal. ADCs are typically hardware devices and once implemented in the SDR, the ADC's capabilities are fixed. As some or all of the ADC tasks that were performed in hardware are implemented in software or firmware, some or all of the ADC tasks may be dynamically adjusted during the operational life of a receiver system without the need to physically change the ADC.

In one embodiment, a software defined radio (SDR) system may comprise at least one radio frequency (RF) receiver, at least one processor, and at least one memory communicatively coupled to the processor. The memory may further store computer readable instructions capable of configuring the system to perform one or more of the methods disclosed herein. For example, the system may be configured to receive a base sampling rate and a desired dynamic range. This information may be programmed or may be input to the system via a system interface or user interface. The system may further be configured to select at least one Nyquist zone. As discussed above, in the microsampling case the Nyquist zone may be at least five times above the base sampling rate. The system may also be configured to select an IF sampling bandwidth and IF sampling rate for the selected Nyquist zone. The IF sampling bandwidth and IF sampling rate may substantially match a low loss filter for providing the selected dynamic range. The system may then sample received RF signals within the selected Nyquist zone at the selected IF sampling rate, and filter the RF signal using the low loss filter.

Figure 8:
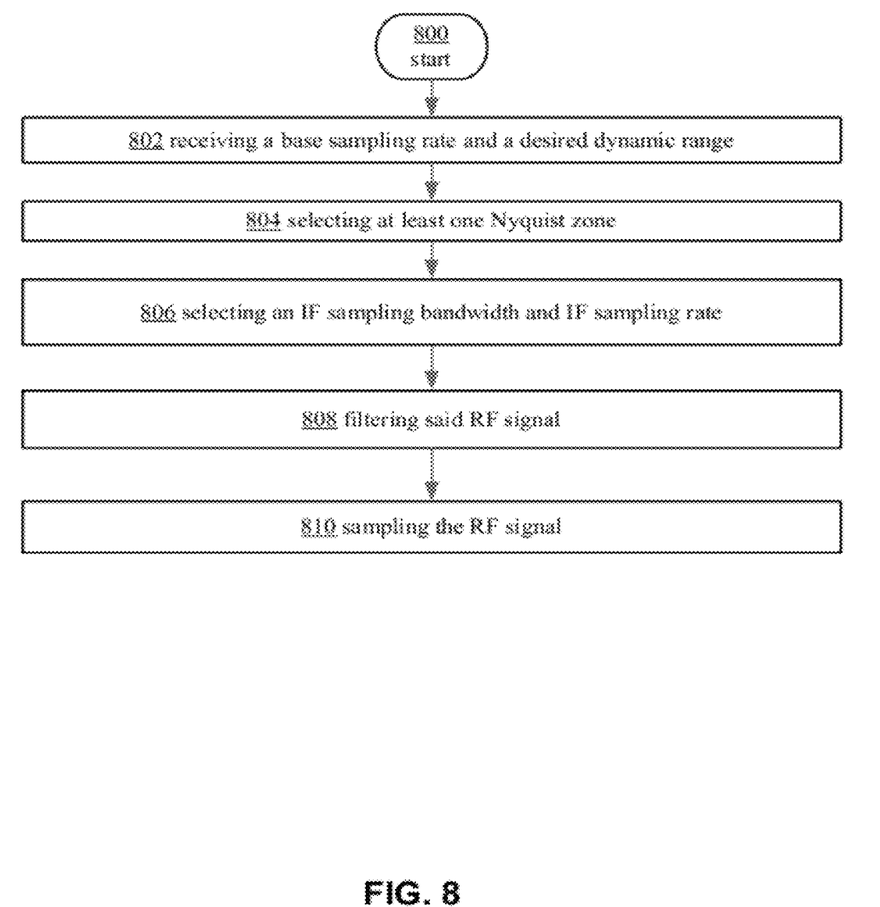
FIG. 8 illustrates an example operational procedure for practicing aspects of the present disclosure.

FIG. 8 depicts an exemplary operational procedure for filtering an intermediate frequency (IF) band when digitizing a radio frequency (RF) signal including operations 800, 802, 804, 806, 808, and 810. Referring to FIG. 8, operation 800 begins the operational procedure and operation 802 illustrates receiving by said system a base sampling rate and a desired dynamic range. Operation 804 illustrates selecting at least one Nyquist zone at least five times above said base sampling rate. Operation 806 illustrates selecting an IF sampling bandwidth and IF sampling rate for said at least one Nyquist zone that substantially matches a low loss filter for providing said dynamic range. Operation 808 illustrates filtering said RF signal using said low loss filter. Operation 810 illustrates sampling the RF signal within the at least one Nyquist zone at said IF sampling rate.

Figure 9:
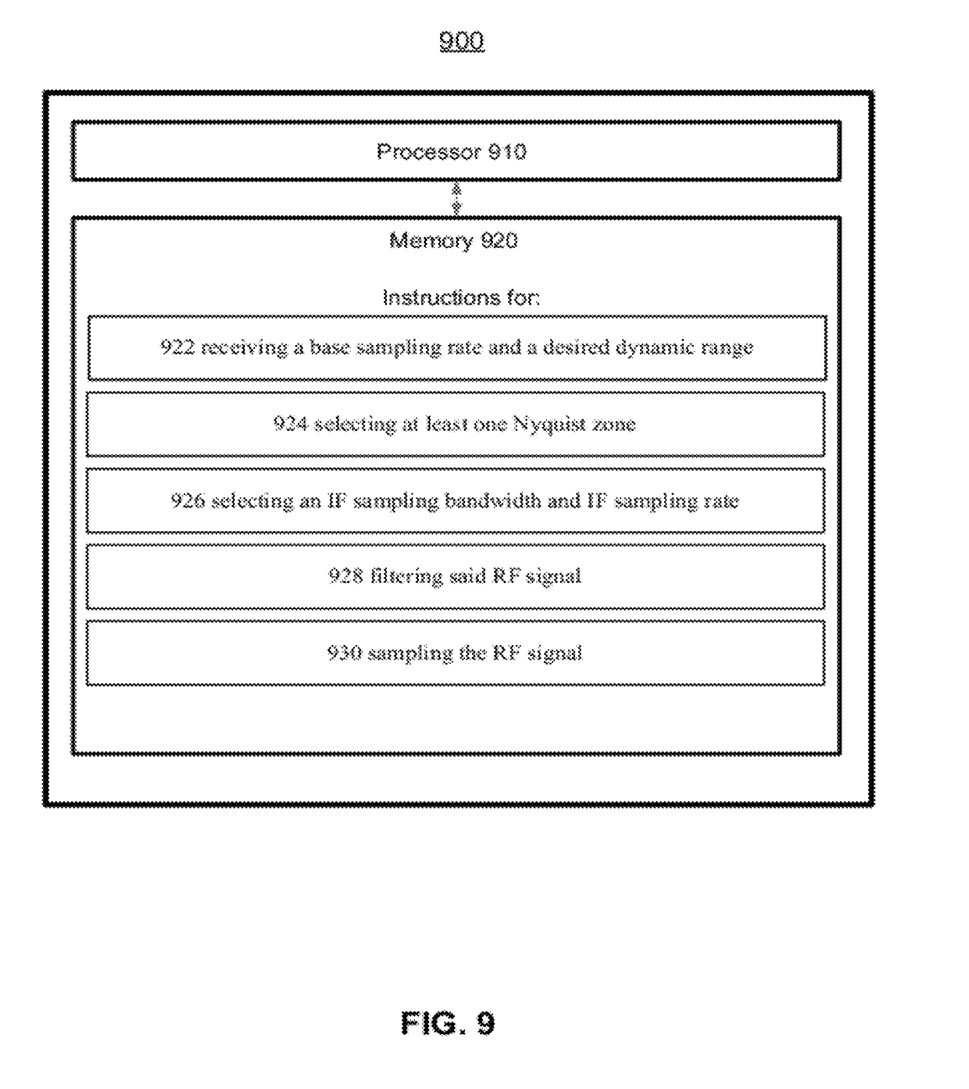
FIG. 9 illustrates an example system and operational procedure for practicing aspects of the present disclosure.

FIG. 9 depicts an exemplary system for filtering an intermediate frequency (IF) band when digitizing a radio frequency (RF) signal as described above. Referring to FIG. 9, system 900 comprises a process 910 and memory 920. Memory 920 further comprises computer instructions configured to execute processes for filtering an intermediate frequency (IF) band when digitizing a radio frequency (RF) signal. Block 922 illustrates receiving by said system a base sampling rate and a desired dynamic range. Block 924 illustrates selecting at least one Nyquist zone at least five times above said base sampling rate. Block 926 illustrates selecting an IF sampling bandwidth and IF sampling rate for said at least one Nyquist zone that substantially matches a low loss filter for providing said dynamic range. Block 928 illustrates filtering said RF signal using said low loss filter. Block 930 illustrates sampling the RF signal within the at least one Nyquist zone at said IF sampling rate.

Any of the above mentioned aspects can be implemented in methods, systems, computer readable media, or any type of manufacture. The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects and embodiments of the invention described herein have been shown and described, it will be apparent to those skilled in the art that, based upon the teachings herein, changes and modifications may be made and, therefore, the appended claims are to encompass within their scope all such changes and modifications as are within the true spirit and scope of the inventions described herein.

What is claimed:

1. A method for use in a software defined radio (SDR) system including an analog to digital convertor (ADC) operating at a sampling rate, Fs, to sample and digitize an intermediate frequency (IF) signal derived from a received radio frequency (RF) signal, comprising:
   selecting a Nyquist zone at least five times above said sampling rate;
   selecting an IF sampling band for the selected Nyquist zone that substantially matches a low loss filter for providing a desired dynamic range;

down-converting the RF signal to said IF sampling band, thereby providing the IF signal within the selected Nyquist zone;

filtering said IF signal using said low loss filter; and sampling the IF signal within the selected Nyquist zone at said sampling rate, wherein said sampling comprises undersampling at less than 20% of said IF sampling band.

2. The method of claim 1, wherein said low loss filter is a surface acoustic wave (SAW) filter.

3. The method of claim 1, wherein the selected Nyquist zone is in a tenth Nyquist zone above said sampling rate.

4. The method of claim 2, wherein the low loss filter is characterized by a shape of 55:5.

5. A software defined radio (SDR) system comprising:

at least one radio frequency (RF) receiver;

at least one analog to digital converter (ADC) communicatively coupled to said RF receiver;

at least one processor communicatively coupled to said ADC; and at least one memory communicatively coupled to said at least one processor, the at least one memory storing therein computer readable instructions capable of configuring said SDR system to perform the following method:

selecting a Nyquist zone at least five times above a sampling rate;

selecting an intermediate frequency (IF) sampling band for the selected Nyquist zone that substantially matches a low loss filter for providing a desired dynamic range;

down-converting the RF signal to said IF sampling band, thereby providing an IF signal within the selected Nyquist zone;

filtering said IF signal using said low loss filter; and sampling the IF signal within the selected Nyquist zone at said sampling rate, wherein said sampling comprises undersampling at less than 20% of said IF sampling band.

6. The SDR system of claim 5, wherein said low loss filter is a surface acoustic wave (SAW) filter.

7. The SDR system of claim 5, wherein said Nyquist zone is in a tenth Nyquist zone above said sampling rate.

8. The SDR system of claim 5, wherein said Nyquist zone is in a fifth Nyquist zone above said sampling rate.

9. The SDR system of claim 5, wherein the low loss filter is characterized by a shape of 55:5.

10. A system for filtering and digitizing an intermediate frequency (IF) or a radio frequency (RF) signal, the system comprising:

means for receiving RF signals;

means for digitizing said RF signals or an IF signal derived from said RF signal;

means for receiving a sampling rate and a desired dynamic range;

means for selecting a Nyquist zone at least five times above said sampling rate;

means for selecting a sampling band for the selected Nyquist zone for providing the desired dynamic range;

low loss filtering means for filtering said signal; and means for sampling and digitizing the signal within the selected Nyquist zone at said sampling rate, wherein said means for sampling comprises means for undersampling at less than 20% of said IF sampling band.

11. The system of claim 10, wherein said low loss filtering means comprises a surface acoustic wave (SAW) filter.

12. The system of claim 10, wherein the selected Nyquist zone is in a tenth Nyquist zone above said sampling rate.

13. The system of claim 10, wherein the selected Nyquist zone is in a fifth Nyquist zone above said sampling rate.

14. The system of claim 11, wherein the low loss filtering means provides a filter shape of 55:5.

\* \* \* \* \*